Patented July 18, 1950

2,515,872

UNITED STATES PATENT OFFICE 2,515,872

PREPARATION OF SECONDARY AND TERTIARY AROMATIC AMINES

Heinz Heinemann, Upper Darby, Pa., assignor to Porocel Corporation, Philadelphia, Pa., a corporation of Delaware No Drawing. Application November 9, 1946, Serial No. 708,927

7 Claims. (Cl. 260—577)

The present invention relates to the production of amines, and more particularly to the production of secondary and tertiary amines by reacting an aliphatic alcohol with an amine containing at least one hydrogen atom bonded to the amino nitrogen atom.

It has been proposed heretofore to prepare higher aliphatic amines by reacting lower aliphatic primary or secondary amines with aliphatic alcohols at elevated temperatures in the presence of dehydrating catalysts such as alumina, aluminum silicate, and oxides of thorium, tungsten, chromium, titanium, and silica. It has also been proposed to carry out similar reactions between aromatic amines such as aniline and lower aliphatic alcohols such as ethyl alcohol at elevated temperatures in the presence of alumina.

It is an object of the present invention to produce secondary and tertiary amines, and particularly secondary and tertiary aromatic amines by reacting an aliphatic alcohol with an aromatic amine containing at least one hydrogen atom bonded to the amino nitrogen atom at a temperature between 450° F. and 600° F. in the presence of thermally activated bauxite containing naturally occurring iron oxide in an amount between 1.25% and 45.0% by weight, and preferably between 4% and 22% by weight. It has been found that activated bauxite containing from 4% to 22% by weight of naturally occurring iron oxide catalyzes the reaction to give higher yields of secondary and tertiary aromatic amines at temperatures lower than those employed in similar processes utilizing activated alumina or alumina gel catalysts. Not only are higher yields at lower temperatures achieved, but the activated bauxite catalyst is much more readily and economically prepared than the special aluminas of the prior art.

In accordance with the present invention, secondary and tertiary amines are prepared by reacting a mixture of an aliphatic alcohol with an aromatic amine containing at least one hydrogen atom bonded to the amino nitrogen atom at temperatures between 450° F. and 600° F. and preferably at about 530° F., in the presence of a catalyst comprising bauxite thermally activated at 600° F. to 1600° F. to a residual moisture content between 12% and 1% by weight, and containing at least 1.25% of naturally occurring iron oxide. Bauxite with as much as 45% of naturally occurring iron oxide may be used. The preferred catalyst is bauxite activated at 1000° F. to 1200° F. to a residual moisture content of 1% to 3% by weight, and containing from 4% to 22% of naturally occurring iron oxide. Activated bauxite containing from 5% to 6% of naturally occurring iron oxide gives excellent yields under the preferred reaction conditions.

The aliphatic alcohols which may be employed in the reaction are those containing from 1 to 20 carbon atoms per molecule, and these alcohols may be saturated or unsaturated and may contain one or more hydroxy groups. The aromatic amines which may be used are exemplified by aniline, mono-methyl aniline, ethyl aniline, propyl aniline, butyl aniline, toluidine, mono-methyl toluidine, ethyl toluidine, propyl toluidine, butyl toluidine, xylidine, mono-methyl xylidine, ethyl xylidine, propyl xylidine, butyl xylidine, naphthylamine, and the higher homologues thereof, or mixtures of two or more thereof. The mole ratio of alcohol to amine may range from 1:1 to 3:1, although higher ratios may be used without detriment. Within this range, increasing amounts of alcohol favor the production of tertiary aromatic amine over the secondary amine. A space velocity between 0.1 and 1.0 volume of liquid charge per volume of catalyst per hour gives good product yields, but at space velocities above about 1.0 the yield diminishes substantially.

In carrying out the reaction, a suitable reactor may be charged with granular or pelleted activated bauxite, and a mixture of the desired alcohol and aromatic amine may be vaporized and passed through the catalyst in the reactor, the temperature of the reactor and contents being controlled by conventional means such as a jacket surrounding the reactor or internal heat exchange tubes for conducting a heating or cooling medium. The pressure within the reactor is preferably atmospheric or slightly higher, although the operation may be carried out at substantial superatmospheric pressures. The products of the reaction may be withdrawn from the reactor and separated by fractional distillation or other means, and unconverted reactants may be recycled for further treatment. At such times as the catalyst loses efficiency, it may be freed of reactants by steaming or solvent treatment, and then regenerated by heating at 600° F. to 1600° F., and preferably 1000° F. to 1200° F., in the presence of an oxidizing gas such as air.

The present invention may be further illustrated by the following examples, which, however, are not to be construed as limiting the scope thereof.

Ethyl alcohol and aniline were mixed and vaporized and passed through a reactor containing 8–14 mesh bauxite at elevated temperature and atmospheric pressure, the space velocity being 0.3, and the effluent from the reactor was fractionated to separate the products, i. e., monoethyl aniline and di-ethyl aniline from the unconverted reactants and water. The catalyst, reaction conditions, and yields are given in the following table. By way of comparison, the results obtained using commercial activated alumina are also given.

| Catalyst | | | | Reaction | | | Yield monoethyl aniline | Yield Diethyl aniline | Per Cent[1] total conversion |
|---|---|---|---|---|---|---|---|---|---|
| Bauxite | Per Cent $Fe^2O^3$ | Act. Temp. | Per Cent V. M. | Ratio Alc. to amine | Space Vel. | React. Temp. | | | |
| | | °F. | | | | °F. | | | |
| #1 | 1.26 | 1,100 | 1.3 | 1.45 | 0.31 | 530 | 53.4 | 2.0 | 32.2 |
| #2 | 4.00 | 1,100 | 1.2 | 1.45 | 0.31 | 530 | -- | -- | 73.2 |
| #3 | 5.65 | 1,100 | 1.3 | 1.45 | 0.28 | 530 | 128.4 | 5.0 | 87.2 |
| #3 | 5.65 | 800 | 6.0 | 1.45 | 0.28 | 530 | 90.7 | 2.0 | 59.0 |
| #3 | 5.65 | 1,100 | 1.3 | 1.45 | 0.32 | 480 | 91.3 | 2.7 | 53.4 |
| #3 | 5.65 | 1,100 | 1.3 | 1.45 | 0.34 | 580 | 129.0 | 15.3 | 77.5 |
| #3 | 5.65 | 1,100 | 1.3 | 2.10 | 0.31 | 530 | 59.9 | 15.2 | 75.1 |
| #4 | 22.5 | 1,100 | 1.4 | 1.45 | 0.30 | 530 | 117.7 | 9.3 | 75.6 |
| Act. $Al^2O^3$ | 0.0 | 1,100 | 1.5 | 1.45 | 0.31 | 530 | 23.3 | 0.0 | 23.3 |

[1] Based upon amount of aniline charged.

From the above results, it is evident that the highest product yield was obtained with bauxite activated at 1100° F. and containing 5.65% of naturally occurring iron oxide. Much lower yields were obtained with bauxite containing only 1.26% of iron oxide, and with that containing 5.65% iron oxide, a considerable difference in yield was obtained, depending upon the bauxite activation temperature, i. e., 1100° F. as against 800° F. Commercial activated alumina containing no iron oxide gave by far the poorest yield of mono- and diethyl aniline.

While the process of the present invention is primarily adapted to the production of secondary and tertiary aromatic amines, it is also applicable to the preparation of secondary and tertiary aliphatic amines by the reaction of aliphatic alcohols with aliphatic amines containing at least one hydrogen atom bonded to the amino nitrogen atom.

I claim:

1. A method for producing secondary and tertiary amines, which comprises contacting an aliphatic alcohol of from 1 to 20 carbon atoms and an aromatic amine containing at least one hydrogen atom bonded to the amino nitrogen atom, at a temperature between 450° F. and 600° F. with bauxite thermally activated at 600° F. to 1600° F. and containing between 4% and 22% of naturally occurring iron oxide.

2. A method for producing secondary and tertiary amines, which comprises contacting an aliphatic alcohol of from 1 to 20 carbon atoms and an aromatic amine containing at least one hydrogen atom bonded to the amino nitrogen atom, at a temperature between 450° F. and 600° F. with bauxite thermally activated at 1000° F. to 1200° F. and containing from 4% to 22% of naturally occurring iron oxide.

3. A method for producing secondary and tertiary amines, which comprises contacting an aliphatic alcohol of from 1 to 20 carbon atoms, and an aromatic amine containing at least one hydrogen atom bonded to the amino nitrogen atom, at a temperature between 450° F. and 600° F. with bauxite thermally activated at 600° F. to 1600° F. and containing at least 1.25% of naturally occurring iron oxide.

4. A method for producing secondary and tertiary amines, which comprises contacting ethyl alcohol and aniline at a temperature between 450° F. and 600° F. with bauxite thermally activated at 600° F. to 1600° F. and containing at least 1.25% of naturally occurring iron oxide.

5. A method for producing secondary and tertiary amines, which comprises contacting ethyl alcohol and aniline at a temperature between 450° F. and 600° F. with bauxite thermally activated at 600° F. to 1600° F. and containing from 4% to 22% of naturally occurring iron oxide.

6. A method for producing secondary and tertiary amines, which comprises contacting ethyl alcohol and aniline at a temperature between 450° F. and 600° F. with bauxite thermally activated at 1000° F. to 1200° F. and containing from 4% to 22% of naturally occurring iron oxide.

7. A method for producing secondary and tertiary amines, which comprises contacting ethyl alcohol and aniline at about 530° F. with bauxite thermally activated at 1000° F. to 1200° F. and containing 5% to 6% of naturally occurring iron oxide.

HEINZ HEINEMANN.

REFERENCES CITED

The following references are of record in the file of this patent:

UNITED STATES PATENTS

| Number | Name | Date |
|---|---|---|
| 2,113,241 | Punnett | Apr. 5, 1938 |

OTHER REFERENCES

Thorpe, "Dictionary of Applied Chemistry" (Longmans, Green & Co., N. Y., N. Y., 1922), vol. III, page 374.

Shinkin et al.: "Chem. Ab.," 29, pages 3584, 3585 (1935).